United States Patent [19]

Ishiguro et al.

[11] 3,843,940

[45] Oct. 22, 1974

[54] DIFFERENTIAL PULSE CODE MODULATION TRANSMISSION SYSTEM

[75] Inventors: Tatsuo Ishiguro; Yukihiko Iijima, both of Tokyo, Japan

[73] Assignee: Nippon Electric Company Limited, Tokyo, Japan

[22] Filed: Oct. 11, 1973

[21] Appl. No.: 405,735

[30] Foreign Application Priority Data

Oct. 11, 1972 Japan .............................. 47-102159

[52] U.S. Cl. ................................ 332/9 R, 325/141

[51] Int. Cl. ............................................ H03k 7/00

[58] Field of Search ......... 332/9; 325/141, 142, 143

*Primary Examiner*—John Kominski

*Attorney, Agent, or Firm*—Sughrue, Rothwell, Mion, Zinn & Macpeak

[57] ABSTRACT

Two embodiments of a transmission system capable of the direct encoding of frequency multiplexed color television signals into differential pulse code modulation signals are disclosed. In the first embodiment, the transmitter includes a pre-emphasis filter whose transfer function assumes a minimum value in the vicinity of the frequency of the color subcarrier signal. The output of the pre-emphasis filter is connected to a noise feedback pulse code modulation coder which delivers quantized signals as a its output. A code converter converts the quantized signals to a differential pulse code modulated signal for transmission. The receiver includes a de-emphasis filter having the inverse transfer function of said pre-emphasis filter. The second embodiment is equivalent to the first but instead of a pre-emphasis filter employs a predictive filter connected in a feedback path around the quantizer. The transfer function P of the predictive filter is such that the value (1–P) assumes a minimum value in the vicinity of the frequency of the subcarrier signal.

6 Claims, 10 Drawing Figures

DIFFERENTIAL PULSE CODE MODULATION TRANSMISSION SYSTEM

BACKGROUND OF THE INVENTION

1. Field of the Invention

The present invention relates to a transmission system for frequency multiplexed signals such as color television signals.

2. Description of the Prior Art

The differential pulse code modulation (DPCM), one of the prediction-type coding methods, is in use for the efficient encoding of television signals. The television signal has a strong correlation between adjacent picture elements, and has a frequency spectrum diminishing with frequency. Hence the DPCM based on the encoding of the difference signal between the adjacent sampling values is effective on the monochrome television signal.

On the other hand, a frequency multiplexed color television signal such as the NTSC, SECAM or PAL video signals includes a subcarrier modulated by the color signal. Therefore, the color signal components tend to be concentrated in the vicinity of the subcarrier frequency which usually exists in a high frequency region of the television video signal. This means that the difference between the adjacent sampling values does not become small due to the subcarrier signal component. This is why the DPCM is not suitable to the color television signal unless appropriate techniques are used. One solution to this problem in the art is to demodulate the frequency-multiplexed color television signal into a base band signal (e.g., luminance signal Y, color signals I and Q in the NTSC system) and then the individual base band signals are respectively encoded into a DPCM signal (see "Digital Coding of Color Picturephone Signals by Element-Differential Quantizer" by J. O. Limb, et al., IEEE Transactions on Communication Technology, December 1971, pp 992 – 1006). In this method, the color television signal is efficiently encoded into a DPCM signal. However, this method employs complicated devices used to demodulate and remodulate the color signal. Furthermore, the deterioration of picture quality is inevitable in the modulation and demodulation process. Another drawback in the prior art is the need for devices to multiplex individually encoded DPCM codes, which complicates system. Still further, this method is not applicable to the color television signal as well as to the monochrome television signal.

SUMMARY OF THE INVENTION

In view of the foregoing, it is a general object of the invention to provide a transmission system capable of the direct encoding of frequency multiplexed color television signals into DPCM signals. Thus, according to the invention, the need for the process of demodulation and remodulation of the color signal component, as well as for the multiplexing of the encoded luminance signal and color signal, is obviated so that a coder and a decoder of simple construction can be realized. In addition, the transmission system according to the invention is compatible between the color television signal and the monochrome television signal.

BRIEF DESCRIPTION OF THE DRAWINGS

The details of the invention will be described below by referring to the accompanying drawings, wherein.

DESCRIPTION OF THE PREFERRED EMBODIMENTS

Figure 1:
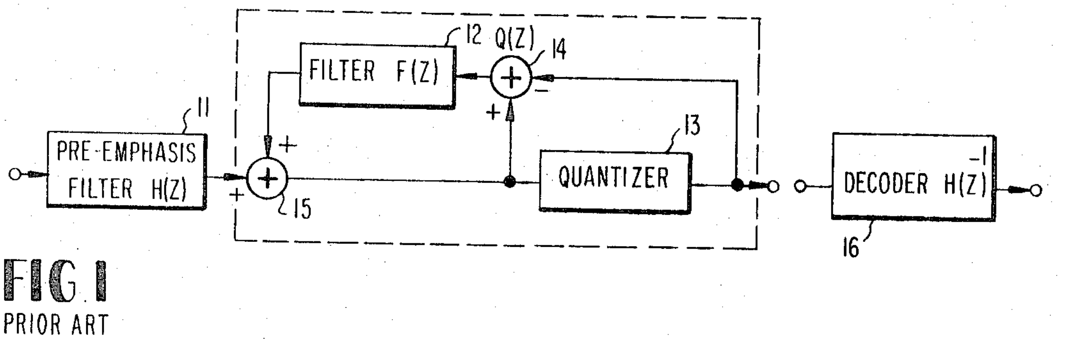
FIG. 1 PRIOR ART
FIG. 1 is a block diagram showing by general equivalent circuit representation a conventional DPCM transmission system.

The DPCM coder may be expressed in the form of a noise feedback PCM coder with a pre-emphasis filter 11, as shown in FIG. 1. For convenience, the well known Z-transform techniques are used for explaining the operation of the transmission system. The parameter Z is given by $e^{j\;\;/f_s}$, where $f_s$ is a sampling frequency. The Z-transform techniques are detailed in the technical literature, Sampled-Data Control Systems by J. R. Ragazzini et al., McGraw-Hill Book Co., Inc. (Particularly, pp 52 – 85).

The transfer characteristic of the coder is equal to the transfer function H(Z) of the pre-emphasis filter 11, and the quantizing noise appearing at the output of the coder is expressed as $(1-F(Z))\cdot Q(Z)$, where F(Z) is the transfer function of a filter 12 of the quantizing error feedback path, and Q(Z) is the difference signal between the output and the input of a quantizer 13. This difference signal is provided from a subtractor 14. The quantizing error is passed through the filter 12 and added to the output of the pre-emphasis filter 11 by way of an adder 15. To make the overall transfer function of the coder and decoder unity, the transfer function of a decoder 16 should be $H(Z)^{-1}$, which is inverse to the characteristic of the pre-emphasis filter 11. Under this condition, the quantizing noise in the output of the decoder is given by $[(1-F(Z))/H(Z)]\cdot Q(Z)$. The ordinary DPCM coder corresponds to the condition given by:

$$H(Z) = 1 - \alpha\cdot Z^{-1} \quad (1)$$

$$F(Z) = \alpha\cdot Z^{-1} \quad (2)$$

Figure 2:
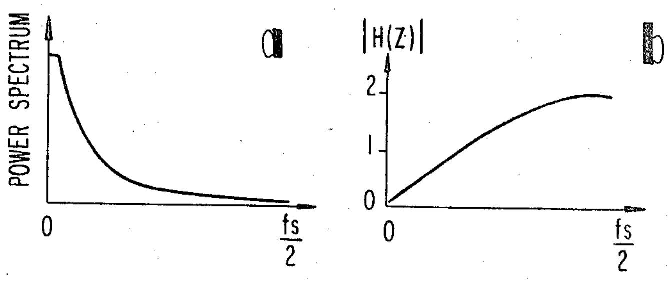
FIG. 2 PRIOR ART
FIGS. 2 (*a*) and (*b*) are diagrams showing a frequency spectrum of a monochrome television signal, and a transfer characteristic of an ordinary DPCM coder, respectively.

FIG. 2 (*a*) indicates the frequency spectrum of a monochrome television signal, and FIG. 2 (*b*) the amplitude characteristic of H(Z) determined by Eq. (1). From Eqs. (1) and (2), it is known that $(1-F(Z))/H(Z)$ is unity, and the quantizing noise in the decoder output is Q(Z) itself. Normally, Q(Z) has a flat spectrum distribution.

Figure 3:
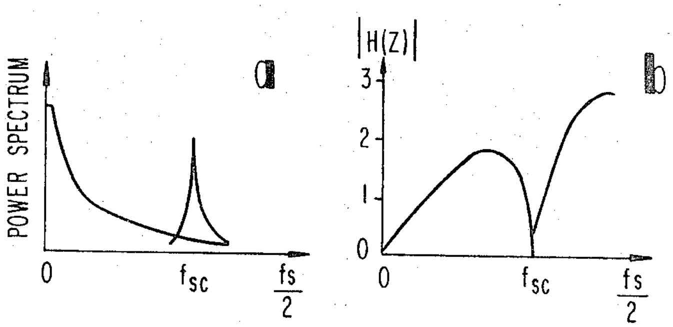
FIGS. 3 (*a*) and (*b*) are diagrams showing a spectrum of a frequency multiplexed television signal and a coder transfer characteristic suited for frequency multiplexed signals, respectively.

In the frequency multiplexed color television signal, there is a component frequency spectrum concentrated in the vicinity of the subcarrier frequency $f_{sc}$ as shown in FIG. 3 (*a*). If this signal is applied to a conventional DPCM coder having a characteristic as shown in FIG. 2 (*b*), the subcarrier component is rather amplified and applied to the quantizer to cause an overload hampering the normal coding. Such overload can be prevented when the subcarrier component is reduced by causing the preemphasis filter characteristic H(Z) to follow a curve coming near zero in the vicinity of $f_{sc}$ as shown in FIG. 3 (*b*).

When the pre-emphasis filter characteristics H(Z) assumes zero in the vicinity of $f_{sc}$, the gain in the transfer characteristic $H(Z)^{-1}$ of the decoder becomes large in the vicinity of $f_{sc}$. Accordingly, F(Z) must be set so that the function (1–F(Z)) assumes zero at $f_{sc}$ not to permit the spectrum of the quantizing noise to increase in the output of the decoder. For example, when $F(Z) = 1 - H(Z)$, then $[1-F(Z)]/H(Z) = 1$. Thus, the quantizing noise in the output of the decoder becomes of flat spectrum expressed as Q(Z) as in ordinary DPCM.

An example of characteristic wherein the amplitude characteristic becomes zero or minimal at the subcarrier frequency $f_{sc}$ is now assumed. To this effect, when the subcarrier frequency $f_{sc}$ is determined to be one-third of the sampling frequency $f_s$, the pre-emphasis filter characteristic may be given by $$H(Z) = (1 - \alpha \cdot Z^{-3}) \cdot A(Z) \quad (3)$$

If $\alpha \approx 1$ (where $\alpha < 1$), the amplitude characteristic of the above H(Z) becomes minimal in the region near zero at the subcarrier frequency $f_{sc} \approx f_s/3$. Generally speaking, H(Z) should include the factor $(1 - \alpha \cdot Z^{-n})$ when $f_{sc} \approx f_s/n$.

The function A(Z) serves to decrease the amplitude characteristic in the low frequency region of H(Z). More specifically, when $A(Z) = 1$, the amplitude characteristic of H(Z) in the low frequency region, which is given by Eq. (3), becomes three times as large as that in ordinary DPCM, with the result that the difference signal amplitude of the luminance signal becomes large. The function may be suitably determined, for example, by $$A(Z) = 1 - \beta \cdot Z^{-1} \quad (4)$$

If this condition is met, the amplitude characteristic of H(Z) in the low frequency region can be reduced by a factor of $(1 - \beta)$.

When the transfer function of the quantizing error feedback path is set to permit $F(Z) = 1 - H(Z)$, $$F(Z) = \beta Z^{-1} + \alpha \cdot Z^{-3} \cdot (1 - \beta Z^{-1}) \quad (5)$$

It should be noted here that F(Z) is not limited to 1 – H(Z) but may be determined in any form so that the quantizing noise spectrum of the decoder output assumes a suitable shape.

Figure 4:
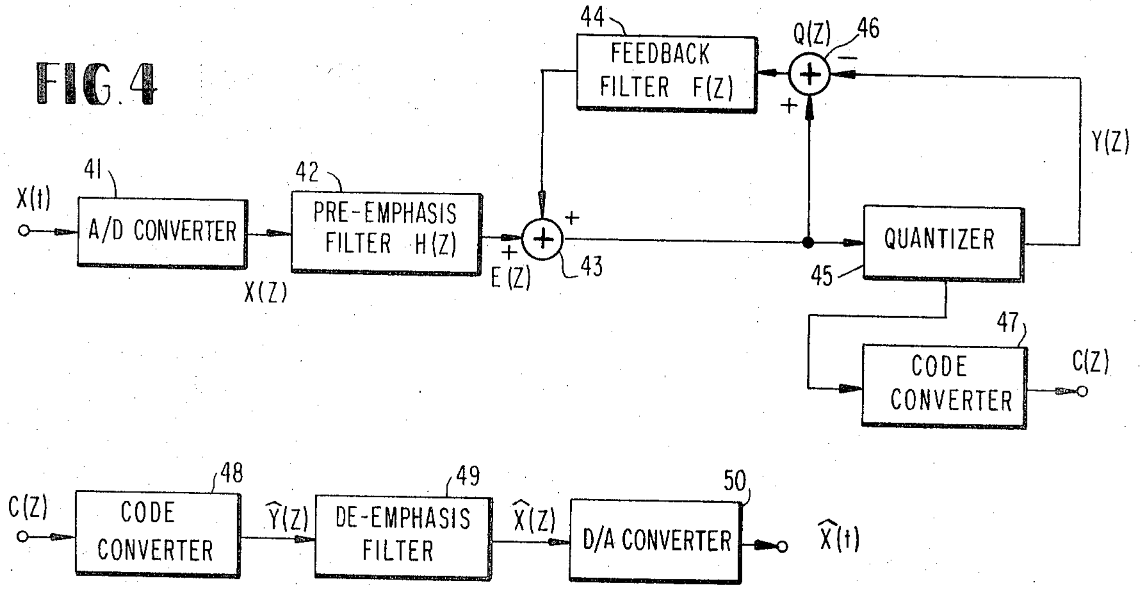
FIG. 4 is a block diagram showing a first embodiment of a DPCM transmission system of the invention.

Now referring to FIG. 4 which is a block diagram showing a first embodiment of the invention, a frequency multiplexed color television signal X(*t*) with subcarrier frequency $f_{sc}$, which is applied to the input of the coder, is converted into a PCM (pulse code modulation) signal X(Z) with sampling frequency $f_s$, by an analog-digital converter 41. The frequency $f_s$ is determined to be about three times as large as the subcarrier frequency $f_{sc}$. The low frequency component and the subcarrier component of the color television signal are suppressed by a pre-emphasis filter 42 having a transfer function;

$$H(Z) = (1 - 0.5 \cdot X^{-1}) \cdot (1 - \alpha \cdot Z^{-3}) \quad (6)$$

where $\alpha = 1-2^{-N}$ (N: a positive integer)

The output of the pre-emphasis filter 42 is a prediction error signal expressed by E(Z). In an adder 43, the output of the quantizing error feedback filter 44 is added to E(Z). The output of the adder 43 is supplied to a quantizer 45 wherein it is quantized according to a predetermined quantizing characteristic.

A subtractor 46 calculates the difference between the output Y(Z) of the quantizer 45 and the input to the quantizer 45 (i.e., the output of the adder 43), thereby generating a quantizing error signal Q(Z). The quantizing error Q(Z) is fed back to the adder 43 by way of the quantizing error feedback filter 44 whose transfer function is $$F(Z) = 0.5Z^{-1} + \alpha(1-0.5Z^{-1}) \cdot Z^{-3} \quad (7)$$

A code converter 47 generates a code C(Z) corresponding to the output level of the quantizer 45 and sends it over to the transmission channel.

In the decoder on the receiving side, the received code C(Z) is converted into the corresponding quantizer output level Y(Z) by a code converter 48. The output Y(Z) of the code converter 48 is supplied to a de-emphasis filter 49 whose transfer function is a reciprocal of H(Z) which is determined by Eq. (6). The reconstructed signal X(Z) is obtained as the output of the de-emphasis filter 49. Then the digital signal X(Z) is converted into a frequency multiplexed color television signal by a digital-analog converter 50.

Figure 5:
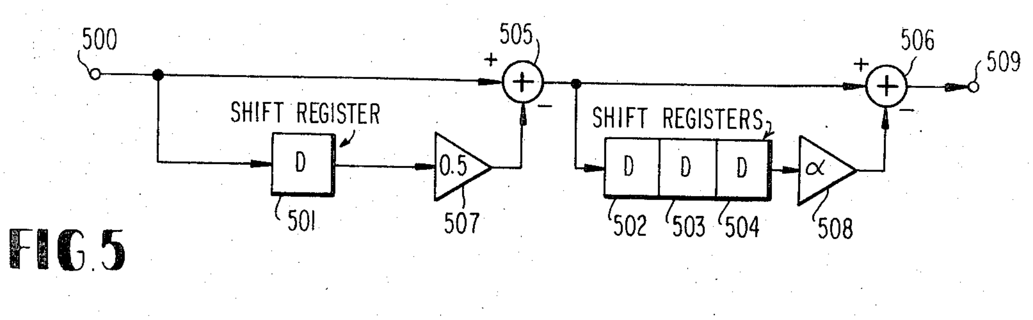
FIGS. 5, 6 and 7 are block diagrams showing examples of preemphasis filter, quantizing error feedback filter, and de-emphasis filter, respectively, which are the elements of the embodiment in FIG. 4.

Referring to FIG. 5, there is shown in block form a concrete example of pre-emphasis filter 42 of FIG. 4. The function H(Z) determined by Eq. (6) is realized with two stages of nonrecursive digital filter characterized by the absence of feedback. The numerals 501, 502, 503 and 504 denote shift registers operated at a clock frequency $f_s$; 505 and 506, subtractors; and 507 and 508, multipliers whose multiplying factors are 0.5 and $\alpha = 1-2^{-N}$ respectively. The multiplier 507 may be composed of a shift register for shifting the input digital signal down by one digit. Similarly, the multiplier 508 may be composed of a shift register for shifting the input signal by N-digits towards the least significant digit and a subtractor for subtracting the shifted signal from the input signal.

The input signal X(Z) to an input terminal 500 is applied to the subtractor 505 and to the shift register 501. In the subtractor 505, one half of the value of the input signal (so multiplied by the multiplier 507), which has been delayed one sampling period by the shift register 501, is subtracted from the input signal. Thus, the result of this operation on the input signal at the transfer function $(1-0.5Z^{-1})$ is obtained as an output of the subtractor 505. This output is supplied to the shift register 502, 503 and 504, each shifting by one sampling period the input signal given to the shift register 502. As a result, a signal delayed by three sampling periods is obtained at the output of the shift register 504. In the subtractor 506, a value being $\alpha = 1-2^{-N}$ times the output of the shift register 504 (so multiplied by the multiplier 508) is subtracted from the output of the subtractor 505. In other words, the output of the subtractor 505 is computed with the transfer function $(1 - \alpha \cdot Z^{-3})$, and the result is obtained at the output of the subtractor 506. This output is obtained at an output terminal 509.

Briefly, therefore, the input to the pre-emphasis filter is computed according to the transfer function $(1-0.5Z^{-1}) \cdot (1 - \alpha Z^{-3})$.

Figure 6:
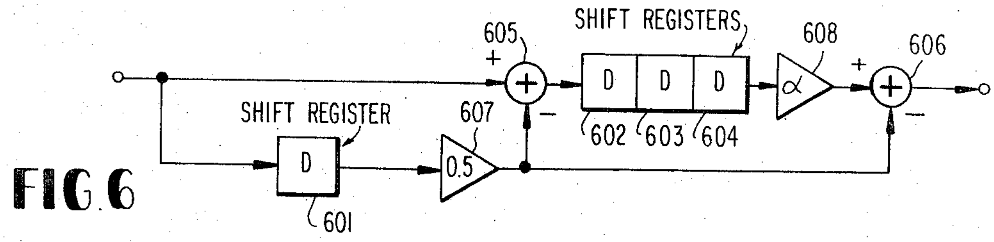

Referring to FIG. 6, there is shown in block form a concrete example of the quantizing error feedback filter 44, as shown in FIG. 4, with a transfer function determined by Eq. (7). In FIG. 6, the numerals 601, 602,

603 and 604 represent shift registers; 605 and 606, subtractors, and 607 and 608, multipliers whose multiplying factors are 0.5 and $\alpha = 1-2^{-N}$ respectively. Each of these circuit elements operates in the same manner as in the previous example illustrated in FIG. 5. These examples are of well-known digital filters and therefore further description will not be given herein.

Figure 7:
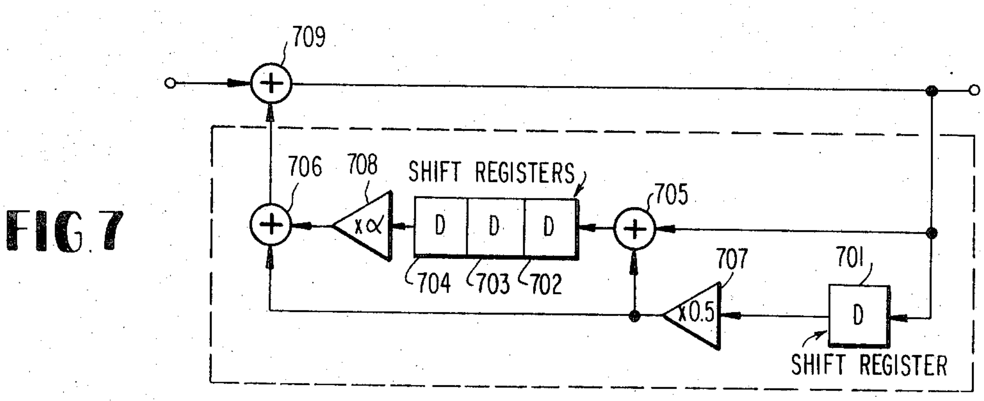

FIG. 7 is a block diagram showing a concrete example of the de-emphasis filter 49, as shown in FIG. 4, with a transfer function $H(Z)^{-1}$ in the decoder. In FIG. 7, the numerals 701, 702, and 703 and 704 denote shift registers; 705 and 706, subtractors; 707 and 708, multipliers whose multiplying factors are 0.5 and $\alpha = 1-2^{-N}$ respectively; and 709, an adder. These elements operate in the same manner as in the example shown in FIG. 5 and therefore further description thereof will not be given here.

Figure 8:
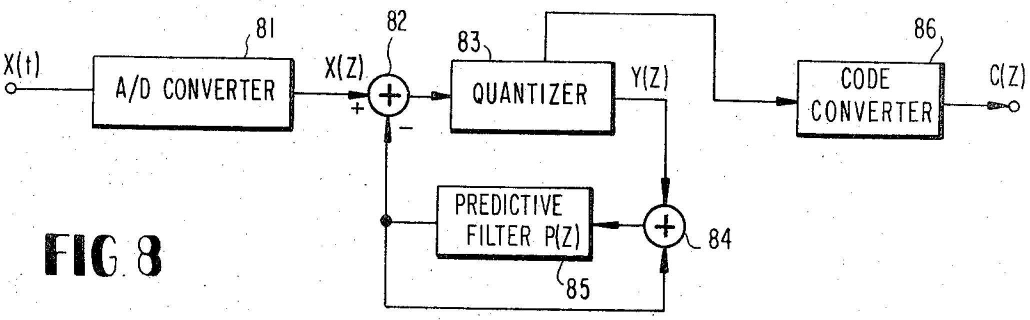
FIG. 8 is a block diagram showing a coder of a second embodiment of the invention.

FIG. 8 is a block diagram showing another embodiment of the invention. This coder is derived from the first embodiment of FIG. 4 by the equivalence conversion technique. This coder is equal to that of a predictive coding system whose predictive characteristic is P(Z). In FIG. 8, the numeral 81 represents an analog-digital converter; 83, a quantizer; and 86, a code converter. These quantizer and code converter are functionally the same as the elements 41, 45 and 47 in FIG. 4. The input signal $X(t)$ is converted into a PCM signal X(Z) by the analog-digital converter 81 and then supplied to a subtractor 82, which provides the difference between the PCM signal X(Z) and the local decoded signal which is a digital output of a predictive filter 85. The output of the subtractor 82 is quantized by the quantizer 83, and the quantized output Y(Z) is supplied to an adder 84, which adds up the local decoded signal and the signal Y(Z). The summed output is supplied to the predictive filter 85. In FIG. 8, the part comprising the adder 84 and the predictive filter 85 corresponds to a local decoder. The transfer function P(Z) of the prediction filter 85 has the following relationship with the transfer function H(Z) of the pre-emphasis filter 11 of FIG. 1.

$$P(Z) = 1 - H(Z) \quad (8)$$

Then, the transfer function P(Z) is given as follows, if the characteristic thereof is the same as the one in the first embodiment.

$$P(Z) = 0.5Z^{-1} + \alpha Z^{-3}(1-0.5Z^{-1}) \quad (9)$$

The transfer function from the output of the quantizer 83 to the input of the subtractor 82, i.e., the transfer function of the local decoder, is $$P(Z)/1 - P(Z) = [0.5Z^{-1} + \alpha Z^{-3}(1 - 0.5Z^{-1})/(1 - 0.5Z^{-1})\cdot(1 - \alpha Z^{-3})]$$

This shows that the amplitude characteristic has a maximal value sufficiently larger than unity at frequency zero and in the vicinity of frequency $f_{sc}$.

The transfer function P(Z) of the prediction filter is the same as F(Z) which is determined by Eq. (7). Hence this prediction filter can be realized in the same manner as in FIG. 6. The coder is simpler in the second embodiment than in the first embodiment. In the second embodiment, the prediction filter is a little more complicated in the transfer function than that of an ordinary DPCM (when the transfer function of the prediction filter 85 is $\alpha Z^{-1}$). Substantially, the second embodiment is considerably simpler than the conventional system in which the color signal is demodulated, the individual signals are encoded into DPCM signals and the resultant DPCM signals are multiplexed for transmission.

In the above embodiment, the predictive coding is made by the digital system after analog-digital conversion. Instead, it may be so arranged that the quantizer 83 is used as an analog-digital converter, the output of the prediction filter is converted into an analog local decoded signal by a digital-analog converter, and the subtractor 82 is constituted of an analog subtractor circuit for deriving the difference between the analog input signal and the analog local decoded signal. Or the output of the quantizer 83 is converted into an analog signal by a digital-analog converter, and the local decoder comprising the adder 84 and the prediction filter 85 is formed of an analog network In the embodiment in FIG. 4, the function of analog-digital conversion may be located after the pre-emphasis filter 42, on the output side of the subtractor 43, or at the quantizer 45, instead of being located before the pre-emphasis filter 42. In this modification a, digital-analog converter is required to be installed in a suitable position according to the location of the function of analog-digital conversion. It is also required that an analog circuit be used to deal with the signal in the process of digital-analog conversion.

What is claimed is:

1. A differential pulse code modulation transmission system for a frequency division multiplexed signal having a subcarrier signal, comprising: a transmitter including, A. a pre-emphasis filter, whose transfer function H assumes a minimum value nearly equal to zero in the vicinity of the frequency of said subcarrier signal, and which delivers a prediction error signal determined by said transfer function H, B. a noise feedback PCM coder, coupled to the output of said preemphasis filter, having (a) an adder for calculating the sum of the output of said pre-emphasis filter and an adding input signal, (b) a quantizer for quantizing the output of said adder to deliver quantized signals each representing the input signal thereof ranging within the respective predetermined quantizing range, (c) a subtractor for calculating the difference between the input and output of said quantizer, and (d) a noise feedback filter whose transfer function F is set so that the value (1–F) assumes a minimum value nearly equal to zero in the vicinity of the frequency of said subcarrier signal, and which delivers said adding input signal, and C. a code converter for applying a code conversion to said quantized signals thereby to transmit a differential pulse code modulation signal corresponding to said frequency division multiplexed signal to a receiver via a transmission line; and said receiver including, D. a code converter for receiving the transmitted differential pulse code modulation signal, and for regenerating said quantized signals, and E. a decoder, coupled to the last-mentioned code converter, which has the inverse transfer function of said transfer function H, thereby to regenerate said frequency division multiplexed signal.

2. A differential pulse code modulation transmission system for a frequency division multiplexed signal having a subcarrier signal, comprising:

a transmitter including,

A. a subtractor for calculating the difference between said frequency division multiplexed signal and a subtracting input signal, B. a quantizer for quantizing the output of said subtractor to deliver quantized signals each representing the input signal thereof ranging within the respective predetermined quantizing range, C. an adder for calculating the sum of the output of said quantizer and an adding input signal, D. a predictive filter, coupled to the output of said adder, whose transfer function P bears the relationship to a transfer function H such that P = 1–H and P is set so that the value (1–P) assumes a minimum value nearly equal to zero in the vicinity of the frequency of said subcarrier signal, thereby to supply the output signal thereof to said subtractor and adder as said subtracting and adding input signals, and E. a code converter for applying a code conversion to said quantized signals thereby to transmit a differential pulse code modulation signal corresponding to said frequency division multiplexed signal to a receiver via a transmission line; and said receiver including, F. a code converter for receiving the transmitted differential pulse code modulation signal, and for regenerating said quantized signals, and G. a decoder, coupled to the last-mentioned code converter, which has the inverse tranfer function of said transfer function H, thereby to regenerate said frequency division multiplexed signal.

3. A differential pulse code modulation transmission system for a frequency division multiplexed signal having a subcarrier as recited in claim 1 further comprising an analog-digital converter in said transmitter connected to the input of said pre-emphasis filter and a digital-analog converter in said receiver connected to the output of said decoder, and wherein said pre-emphasis filter, said noise feedback filter and said decoder are digital filters.

4. A differential pulse code modulation transmission system for a frequency division multiplexed signal having a subcarrier as recited in claim 1 wherein said transfer function H is represented by a Z-transform including the factor $(1-\alpha Z^{-n})$ when $f_{sc} \approx f_s/n$ where $f_{sc}$ is the frequency of said subcarrier signal, $f_s$ is the sampling frequency of said quantizer, $\alpha$ is a constant less than one, and $n$ is a positive integer.

5. A differential pulse code modulation transmission system for a frequency division multiplexed signal having a subcarrier as recited in claim 2 further comprising an analog-digital converter in said transmitter connected to the input of said subtractor and a digital-analog converter in said receiver connected to the output of said decoder, and wherein said predictive filter and said decoder are digital filters.

6. A differential pulse code modulation transmission system for a frequency division multiplexed signal having a subcarrier as recited in claim 2 wherein the value (1–P) is represented by a Z-transform including the factor $(1-\alpha Z^{-n})$ when $f_{sc} \approx f_s/n$ where $f_{sc}$ is the frequency of said subcarrier signal, $f_s$ is the sampling frequency of said quantizer, $\alpha$ is a constant less than one, and n is a positive integer.

* * * * *

UNITED STATES PATENT OFFICE
CERTIFICATE OF CORRECTION

Patent No. 3,843,940 Dated October 22, 1974

Inventor(s) Tatsuo Ishiguro et al

It is certified that error appears in the above-identified patent and that said Letters Patent are hereby corrected as shown below:

In The Specification:

Column 2, line 32, after "by" the equation should read -- $e^{j\omega/f_s}$ --

Column 4, line 17, "Y (Z)" should be -- $\hat{Y}(Z)$ --

Column 4, line 18, "Y(Z)" should be -- $\hat{Y}(Z)$ --

Column 4, line 21, "X(Z)" should be -- $\hat{X}(Z)$ --

Column 4, line 22, "X(Z)" should be -- $\hat{X}(Z)$ --

Column 6, line 15, insert a period (.) after "network"

Signed and sealed this 14th day of January 1975.

(SEAL)
Attest:

McCOY M. GIBSON JR.
Attesting Officer

C. MARSHALL DANN
Commissioner of Patents